J. H. BROWN.
Machines for Cutting Corn-Stalks.
No. 149,715. Patented April 14, 1874.

2 Sheets--Sheet 2.
J. H. BROWN.
Machines for Cutting Corn-Stalks.
No. 149,715. Patented April 14, 1874.
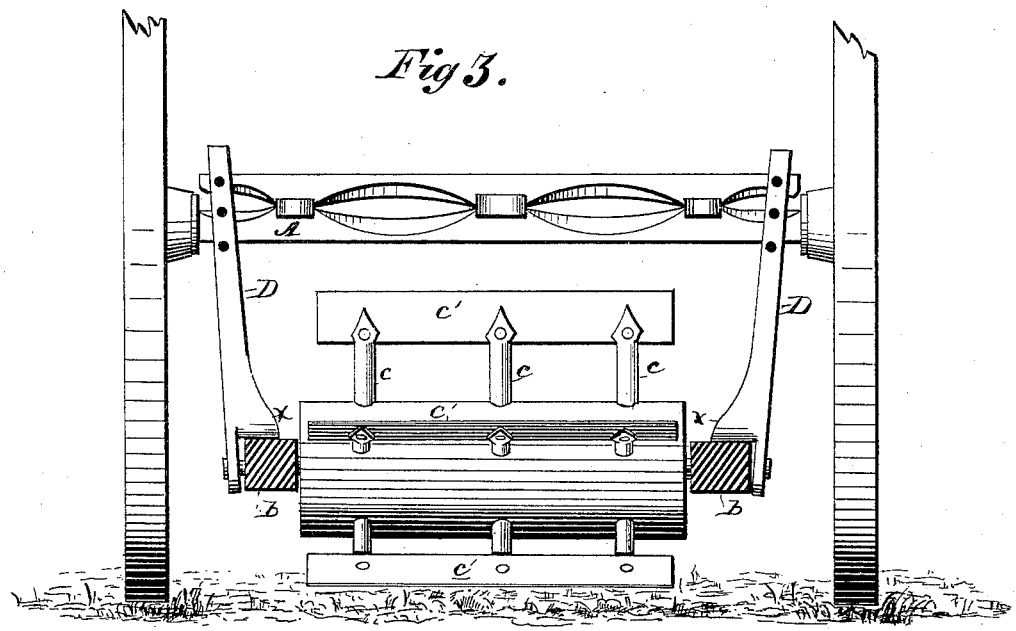
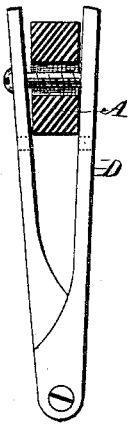
Witnesses:
H. C. Clark
Fred K. Swett
Inventor.
James H. Brown.
by Dyer, Beadle & Co.
Attys.

UNITED STATES PATENT OFFICE.

JAMES H. BROWN, OF BARNARD, MISSOURI.

IMPROVEMENT IN MACHINES FOR CUTTING CORN-STALKS.

Specification forming part of Letters Patent No. 149,715, dated April 14, 1874; application filed September 5, 1873.

*To all whom it may concern:*

Be it known that I, JAMES H. BROWN, of Barnard, in the county of Nodaway and State of Missouri, have invented new and useful Improvements in Machines for Cutting Corn-Stalks; and I do hereby declare that the following is a full and exact description of the same, reference being had to the accompanying drawings, and to the letters of reference marked thereon.

This invention is designed for cutting corn-stalks, &c., in the field, and consists mainly of a frame of peculiar construction, which is adapted to be attached in an adjustable manner to the hind part of the running-gear of a wagon, as will be fully described hereinafter.

Figure 1:
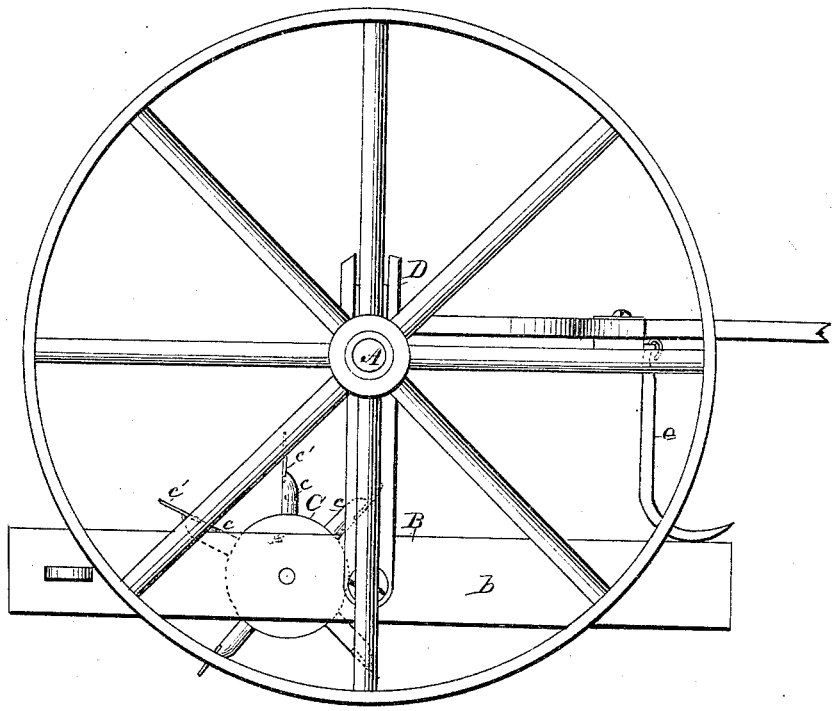
Figure 2:
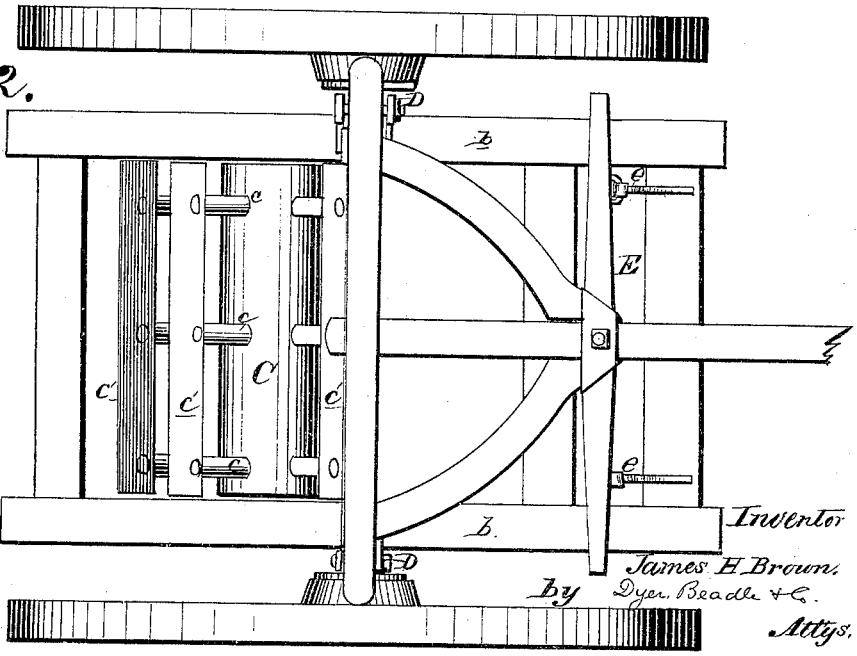

In the drawings, Figure 1 represents a side elevation of my improved machine; Fig. 2, a plan view of the same; Fig. 3, an end elevation, and Fig. 4 a side elevation, of the standards detached.

To enable others skilled in the art to make and use my invention, I will now proceed to describe fully its construction and manner of operation.

A represents the axle, provided, in the usual manner, with wheels, bolsters, hounds, &c. B represents the frame carrying the cutting mechanism, which consists simply of side beams *b b*, suitably united by cross-beams, as shown. C represents a cylinder, of proper material and size, suitably journaled to the frame, preferably a little in the rear of the center, which is provided, at regular and suitable intervals, with radiating arms *c c c*, having attached at their outer ends knife-blades *c'*, as shown. D D represent standards, pivoted at their lower ends to the side beams of the frame B, which are forked at their upper ends in such a manner as to extend beyond the axle and bolster on each side, as shown. The lower end of each standard has a shoulder extending over the upper surface of the side beam of the frame, which has a curved face, as shown. The standards are further provided with suitable holes, by means of which they are secured in any desired position by a bolt passing between the axle and the bolster, as shown. E represents the double-tree, secured to the pole in the usual manner, from which depend hooks *e e*, as shown.

The operation of the machine is as follows: It is drawn over the field in any proper manner, the frame being elevated or depressed, as more or less weight is required to cut the stalks. The hooks *e e* are designed to draw the stalks under the knives. The frame is adapted to swing upon the pivots of its supporting-standards sufficiently to accommodate itself to the uneven nature of the ground, but undue motion in either direction is prevented by the overhanging shoulder of the standard.

I do not limit myself to any particular dimensions, but the following have been found to make a suitable machine: Frame, six feet long and three feet wide; cylinder, twelve inches in diameter; arms extending ten inches from the center of the cylinder, and made of three-fourth-inch square iron. The knives are five in number. The journals are one-and-one-fourth-inch square iron, with rounded ends. The machine, as a whole, is very simple, and yet well adapted for the purpose for which it is intended.

Having thus fully described my invention, what I claim as new, and desire to secure by Letters Patent, is—

In a corn-stalk cutter, the forked standards D, having the overhanging shoulders X, in combination with the frame B, the standards being adapted, by means of the overhanging shoulders, to limit the oscillations of the frame, substantially as described.

This specification signed and witnessed this 15th day of July, 1873.

JAMES H. BROWN.

Witnesses:
 AMOS BAKER,
 LEWIS J. DAVIDSON.